US012583101B2

(12) United States Patent
Hübner

(10) Patent No.: US 12,583,101 B2
(45) Date of Patent: Mar. 24, 2026

(54) METHOD FOR OPERATING A MODULAR ROBOT, MODULAR ROBOT, COLLISION AVOIDANCE SYSTEM, AND COMPUTER PROGRAM PRODUCT

(71) Applicant: Daniel Hübner, Scheßlitz (DE)

(72) Inventor: Daniel Hübner, Scheßlitz (DE)

(73) Assignee: Siemens Aktiengesellschaft, Munich (DE)

( * ) Notice: Subject to any disclaimer, the term of this patent is extended or adjusted under 35 U.S.C. 154(b) by 166 days.

(21) Appl. No.: 18/231,501

(22) Filed: Aug. 8, 2023

(65) Prior Publication Data

US 2024/0042596 A1 Feb. 8, 2024

(30) Foreign Application Priority Data

Aug. 8, 2022 (EP) ..................................... 22189323

(51) Int. Cl.
| | |
|---|---|
| *B25J 9/16* | (2006.01) |
| *B25J 9/08* | (2006.01) |
| *B25J 13/08* | (2006.01) |
| *B25J 19/06* | (2006.01) |

(52) U.S. Cl.
CPC ................. *B25J 9/08* (2013.01); *B25J 9/162* (2013.01); *B25J 9/1666* (2013.01); *B25J 13/088* (2013.01)

(58) Field of Classification Search
CPC ......... B25J 9/00; B25J 9/16; B25J 5/00; B25J 5/007; B25J 9/02; B25J 9/1612; B25J 9/1643; B25J 9/08; B25J 9/162; B25J 9/1666; B25J 13/088; B25J 9/1694; B25J 9/1674; B25J 19/06; G05D 1/0077; G05D 1/0055; G05D 1/0268; G05D 1/24; G05D 1/857; G05D 1/85; G05D 1/87; B60W 2050/0292; B60W 50/023;
(Continued)

(56) References Cited

U.S. PATENT DOCUMENTS

| | | | |
|---|---|---|---|
| 2017/0183155 A1* | 6/2017 | Kazama | G05D 1/0287 |
| 2021/0116923 A1* | 4/2021 | Swann | B25J 5/007 |

(Continued)

FOREIGN PATENT DOCUMENTS

| | | |
|---|---|---|
| DE | 102017009939 A1 | 4/2019 |
| EP | 4008497 A1 | 6/2022 |

*Primary Examiner* — Adam R Mott
*Assistant Examiner* — Byron Xavier Kasper
(74) *Attorney, Agent, or Firm* — Lempia Summerfield Katz LLC

(57) ABSTRACT

A method for operating a modular robot including a first module and a second module is provided. The first module includes a first controller, and the first controller includes a first failsafe position detection for a movable element of the first module. The method includes controlling the second module, which includes detecting a first position of movable elements via a first single position detector. A second position of the movable elements is detected via a second position detector, which is configured as a position probe that is attachable to the at least one movable element of the second module. The second position is combined with the first position to form a second failsafe position detection. The first failsafe position detection is combined with the second failsafe position detection to form a combined failsafe position detection for the modular robot.

15 Claims, 1 Drawing Sheet

(58) Field of Classification Search

CPC ........... G05B 2219/37235; G05B 2219/39022;
                                     G05B 2219/40298

See application file for complete search history.

(56) References Cited

U.S. PATENT DOCUMENTS

| | | | | |
|---|---|---|---|---|
| 2022/0016782 A1* | 1/2022 | Carey | ................... | H04B 17/27 |
| 2023/0131337 A1* | 4/2023 | Giersch | ................. | A61B 34/30 |
| | | | | 700/245 |

* cited by examiner

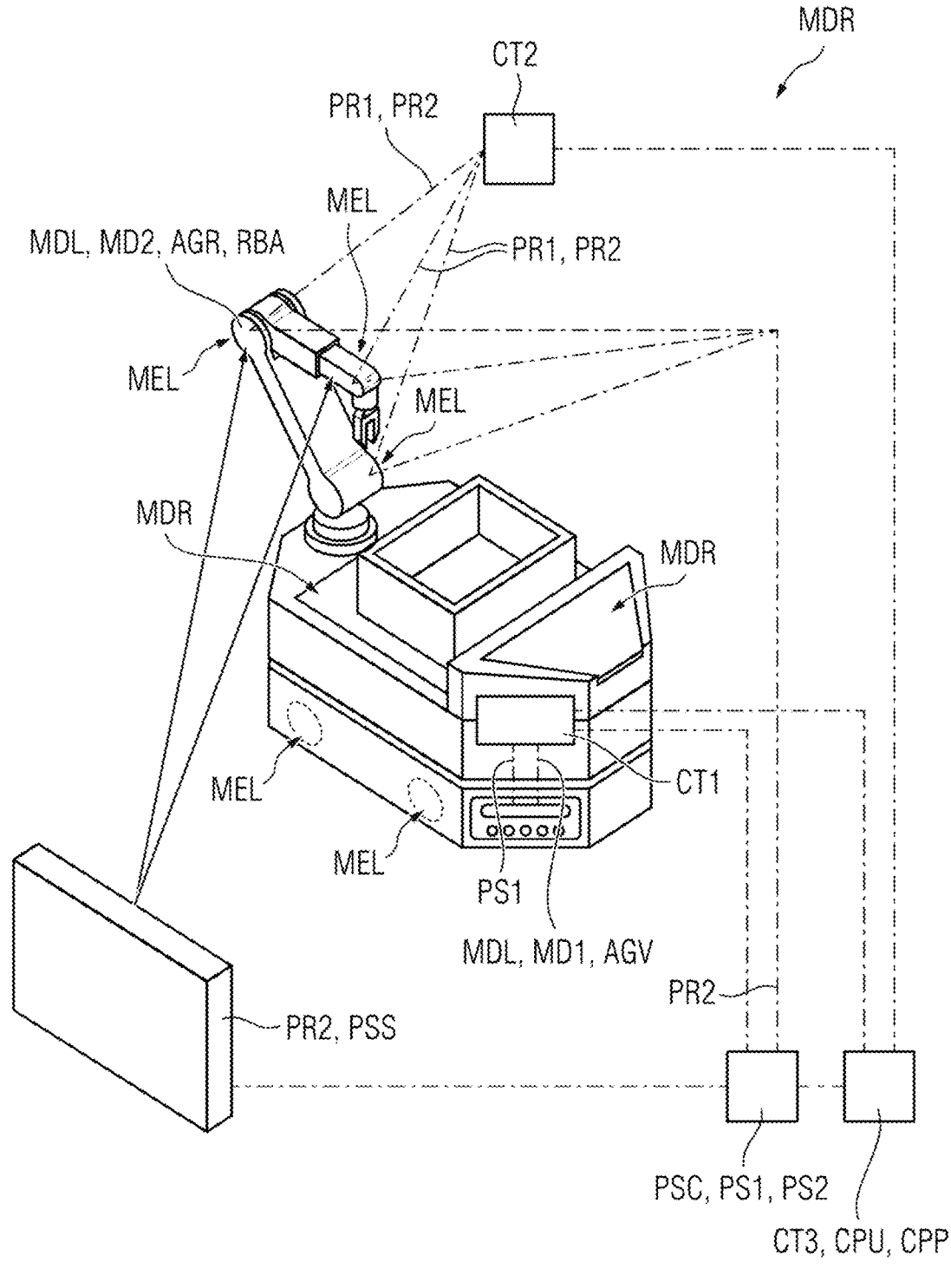

METHOD FOR OPERATING A MODULAR ROBOT, MODULAR ROBOT, COLLISION AVOIDANCE SYSTEM, AND COMPUTER PROGRAM PRODUCT

This application claims the benefit of European Patent Application No. EP 22189323.3, filed on Aug. 8, 2022, which is hereby incorporated by reference in its entirety.

BACKGROUND

The present embodiments relate to operating a modular robot.

To provide operational safety of robots, avoiding collisions (e.g., with people in a hazardous area) is a key objective. To this end, the positions of elements of the robot that are at risk of collision are to be known. Knowing the positions at all times requires failsafe detection to take place.

Failsafe position detection requires dual-channel and diverse detection.

A dual-channel structure, unlike a single-channel structure, is failsafe against individual faults. In the event of failure or an outage in one channel, the respective other channel is still able to carry out at least one safety function, or to initiate the safe state.

Diversity is also present when, in the respective channels of the dual-channel or multichannel structure, different technical solutions are provided for the same function. These technical solutions may be provided both in the form of hardware and in the form of software.

The failsafe position of the AGV/AMR is at present detected using what are known as safety-compatible transmitters (e.g., TR Electronics). The attribute "safety-compatible" refers to what is known as a safety requirement level. The safety requirement level is a term from the field of functional safety and is also referred to in international standards according to IEC61508/IEC61511 as a safety level or safety integrity level (SIL for short). The higher the SIL of a safety-related system, the lower the likelihood of the system not carrying out the required safety function. The meeting of a safety requirement level depends on the overall system under consideration.

If dual-channel and diverse, and thus failsafe using the terminology of this disclosure, position detection is provided, it is possible to compare the positions of the same element detected in different ways and to end operation in the event of deviations beyond a tolerance threshold.

EP1366867B1 already discloses a method for avoiding collisions between a robot and at least one other object.

A failsafe position may, for example, be computed in the SIMATIC S7 failsafe programmable logic controller (PLC) from Siemens, provided that the sensor-based position detection is likewise of failsafe design.

The harmonized European standards EN ISO 10218-1 and EN ISO 10218-2 are applicable to the safety of industrial robots.

Failsafe position detection in the case of a robot of modular design is generally possible only when all of the modules have a harmonized sensor system, regulation means, and control means. Modules from different manufacturers generally cannot be combined to form a modular robot able to be operated safely due to standardization not usually being performed to any significant extent, because there is no reliable position detection of elements of the individual modules that are at risk of collision.

SUMMARY AND DESCRIPTION

The scope of the present invention is defined solely by the appended claims and is not affected to any degree by the statements within this summary.

The present embodiments may obviate one or more of the drawbacks or limitations in the related art. For example, a method that avoids the problems and disadvantages explained is provided.

As another example, position detection of elements of robots of modular design is designed to be failsafe, such that operational safety is able to be provided.

In order to improve operational safety in spite of modularity and to meet relevant safety rules, the present embodiments provide the acts of the method: detecting a position of a movable element of a second module via a third position detection means, which is configured as a position probe able to be attached to this element; (c) combining a second position detection means with the third position detection means to form a second failsafe position detection means; and (d) combining a first failsafe position detection means with the second failsafe position detection means to form a combined failsafe position detection means for the modular robot.

A modular robot of the type defined at the outset also contributes to solving the problem. The modular robot has a second single position detection means including an attachable position probe for detecting the position of the movable element of the second module. A second control unit of the second module and/or the first control unit and/or a superordinate third control unit is configured to: i. combine the second single position detection means with the first single position detection means to form a second failsafe position detection means; and ii. combine the first failsafe position detection means with the second failsafe position detection means to form a combined failsafe position detection means for the modular robot.

The first control unit may be a failsafe control means of an automated guided vehicle (AGV) or an autonomous mobile robot (AMR). The automated guided vehicle essentially follows fixed paths. A difference between an automated guided vehicle and an autonomous mobile robot may be explained with reference to an example. In the case of an autonomous mobile robot, the path to be taken is not known beforehand, and is computed at runtime. If there is an obstacle in the path, the control means of the autonomous mobile robot computes the evasion route; the automated guided vehicle would simply stop. As a result, both the automated guided vehicle and the autonomous mobile robot are thus always meant, unless this depends explicitly on the difference.

Combinations that make sense to a person skilled in the art of the subjects of the independent claims with features of developments that are disclosed here, including in addition to the back-references of the dependent claims disclosed explicitly in this document, are likewise encompassed by the invention.

Some aspects and possible embodiments of the invention are described below with reference to an example. The measures according to the invention achieve collision avoidance between an autonomous mobile robot of modular design, consisting of a robot that may be mounted on an automated guided vehicle (AGV) or on an autonomous mobile robot, and, for example, the machine operators. One particular challenge is that the position of the autonomous mobile robot is to be detected in a failsafe manner (e.g., dual-channel, with diversity, such that any fault does not lead to failure of the reliable position detection). The robot of modular design may, for example, consist of a robot that is mounted on an automated driverless vehicle (e.g., automated guided vehicle (AGV)).

One particular problem in this regard consists in determining the failsafe position of the robot. This is often computed in the manufacturer-specific robot control means, but is not accessible to other control means or applications. Failsafe location of the autonomous mobile robot is thus not possible. For the autonomous mobile robot of the type described above, it makes sense for the automated driverless vehicle (AGV) and the robot to be considered as one unit. As soon as the automated driverless vehicle (AGV) or a robot arm moves, this has effects on the Cartesian position of the autonomous mobile robot.

Reliable position detection is conventionally not possible since the robot control means does not make the reliable position available to other control means. By way of example, there are no uniform interfaces of the type from a standard to which the various robot manufacturers would adhere.

At present, a robot control means of the respective individual modules delivers the non-reliable position of the articulations to a control means of the automated driverless vehicle (e.g., the failsafe SIMATIC S7).

One advantageous development of the present embodiments makes provision for the position probe to transmit the position coordinates wirelessly or for the position probe to be configured to transmit the position coordinates wirelessly.

One advantageous development of the present embodiments makes provision for the attachable position probe to have a transponder or to be configured as a transponder that is configured for localization. By way of example, the second module may be provided, at the articulations, with a respective transponder as position probe (e.g., SIMATIC RTLS transponder). The position probe determines the position X, Y, and Z (e.g., via GPS) and transmits the position to the SIMATIC S7. A transponder is in this case a radio communication device that receives incoming signals and automatically responds to the incoming signals or forwards the incoming signals. By way of example, the compact transponder SIMATIC RTLS4083T is provided for the localization of objects. These transponders generally deliver spatial coordinates. The software in a failsafe control means (e.g., a SIMATIC S7, such as an automated driverless vehicle) that checks the two non-secure positions (e.g., a first determined position comes from the robot control means, a second determined position comes in each case from a transponder) in terms of similarity. If both positions match to within a predetermined tolerance limit, this may be assumed to be a failsafe position, and the failsafe position of the autonomous mobile robot is ascertained.

Advantages of the present embodiments are, for example, independence from the robot manufacturer and robustness against environmental influences (e.g., light, dust). Comparable reliability (e.g., independently of the environmental conditions) cannot be achieved using a camera-based system, because this relies on a sufficiently clear view. Further, the solution according to the present embodiments may be used in many ways for different robot solutions that are of modular design.

A kinematic chain is understood by the present embodiments to be that in each case two fixed bodies are explicitly connected kinematically to one another to form a chain, such as, for example, in the case of robot gripper arms or excavator arms. As is known from general drive technology, the individual bodies connected to one another are usually attached to one another by an articulation with a degree of freedom f=1. This is generally an open chain but is not necessarily so. An individual drive is usually provided for each articulation. A respective drive with a respectively closed kinematic chain may also be provided at each connection point.

The present embodiments are concerned with elements at risk of collision (e.g., involves movable elements that are not completely protected against collisions by an enclosure).

BRIEF DESCRIPTION OF THE DRAWING

FIG. 1 shows a schematic simplified illustration of a modular robot with an additional illustration of A method according to an embodiment.

DETAILED DESCRIPTION

Functionally same components are sometimes provided with same reference signs.

FIG. 1 shows a schematic simplified illustration of a modular robot MDR. The modular robot MDR includes two modules MDL, a driverless transport vehicle AGV as a first module MD1 and an autonomous mobile robot AGR as a second module MD2.

The driverless transport vehicle AGV forms a kinematic chain with the modular robot MDR by virtue of movements of the driverless transport vehicle AGV being transferred directly to the modular robot MDR.

The driverless transport vehicle AGV has a first control means CT1 (e.g., a first controller) independent of the modular robot MDR. The first controller CT1 is connected to a first failsafe position detection means PS1 (e.g., a first failsafe position detection) for the movable element MEL of the first module MD1 or contains same.

The modular robot MDR has a first single position detection means PR1 (e.g., a first single position detector) for detecting the position of the movable element MEL, which is configured as a robot arm RBA, and transmits this position to a second control unit CT2 (e.g., a second controller). This second controller CT2, unlike what is illustrated schematically in the simplified illustration, is part of the robot arm RBA.

The robot arm RBA, at articulations, is also provided, in each case, with a second single position detection means PR2 (e.g., a second single position detector) including in each case an attachable position probe PSS for detecting the position of the movable element MEL. To simplify the FIGURE, only one position probe PSS is illustrated in magnified form, and the actual respective attachment to the robot arm RBA is illustrated via an arrow. The position probe PSS is configured as a transponder TRP that is configured for localization. The position from the second single position detector PR2 is transmitted wirelessly to a combined failsafe position detection means PSC (e.g., a processor configured to determine a combined failsafe position detection). In addition to this, the combined failsafe position detection PSC receives the first single position detection PR1 and the first failsafe position detection PS1, and combines this information to form a second failsafe position detection PS2 and ultimately to form a combined failsafe position detection PSC for the overall modular robot MDR including all movable elements MEL.

The combined failsafe position detection PSC for the overall modular robot MDR is transmitted to a superordinate third control unit CT3 (e.g., a superordinate third controller), which controls all actions of the modular robot MDR in superordinate fashion via the second controller CT2 and the third controller CT3. This superordinate third controller CT3 thus includes at least parts of a collision avoidance system CPS or of a computer program product CPP, prepared to be executed on at least one computer CPU so as to perform the method according to the present embodiments for controlling the modular robot MDR according to the present embodiments. The collision avoidance system CPS or the computer program product CPP may be kept back, stored, or provided as a distributed system including various components in various control components and sensors of the modular robot MDR in a manner able to be executed so as to carry out the method according to the present embodiments.

Until now, the present embodiments have been described with respect to the method. Features, advantages, or alternative embodiments herein may be assigned to the other subjects (e.g., the computer program or a device; the device or a computer program product and vice versa). In other words, the subject matter claimed or described with respect to the device may be improved with features that are described or claimed in connection with the method, and vice versa. In this case, the functional features of the method are configured by structural units of the system or vice versa. In information technology, a software implementation and a corresponding hardware implementation are generally equivalent. For example, a method act for "storing" data may thus be carried out using a memory unit and corresponding instructions for writing data to the memory. In order to avoid redundancy, the device may also be used in the alternative embodiments described with reference to the method, but these embodiments are not explicitly described again for the device.

The present embodiments include the fact that not all acts of the method have to be necessarily carried out on the same computer entity, but rather may also be carried out on different computer entities.

It is also possible for individual acts of the method described above to be able to be carried out in one unit and for the remaining components to be able to be carried out in another unit as a distributed system.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method for operating a modular robot, wherein the modular robot comprises at least a first module and a second module, wherein each of the first module and the second module includes at least one movable element, wherein the at least one movable element of the first module and the at least one movable element of the second module together form a kinematic chain, wherein the first module includes a first controller, wherein the first controller includes a first failsafe position detection for the at least one movable element of the first module, wherein the second module includes a second controller and a first single position detector for one or more movable elements of the at least one movable element of the second module, the method comprising:

controlling the second module, the controlling of the second module comprising detecting a first position of the at least one movable element of the second module via the first single position detector;

detecting a second position of the at least one movable element of the second module via a second single position detector, the second single position detector being configured as a position probe that is attachable to the at least one movable element of the second module;

combining the first position with the second position, such that a second failsafe position detection is formed;

combining the first failsafe position detection with the second failsafe position detection, such that a combined failsafe position detection is formed for the modular robot; and controlling, by a third controller, the modular robot based on the combined failsafe position detection.

2. The method of claim 1, wherein the first module is a driverless transport vehicle.

3. The method of claim 1, wherein the second module is an autonomous mobile robot comprising a robot arm.

4. The method of claim 2, wherein the second module is an autonomous mobile robot comprising a robot arm.

5. A modular robot comprising:

at least a first module and a second module, wherein each of the first module and the second module comprises at least one movable element, wherein the at least one movable element of the first module and the at least one movable element of the second module together form a kinematic chain, wherein the first module comprises a first controller, wherein the first controller comprises a first failsafe position detection for the at least one movable element of the first module, wherein the second module comprises a first single position detector for one or more movable elements of the at least one movable element of the second module; and a second single position detector comprising an attachable position probe configured to detect a position of the at least one movable element of the second module, wherein a second controller of the second module, the first controller, a superordinate third controller, or any combination thereof is configured to:

combine the first single position detector with the second single position detector, such that a second failsafe position detection is formed;

combine the first failsafe position detection with the second failsafe position detection, such that a combined failsafe position detection is formed for the modular robot; and control the modular robot based on the combined failsafe position detection.

6. The modular robot of claim 5, wherein the first module is a driverless transport vehicle.

7. The modular robot of claim 5, wherein the second module is an autonomous mobile robot comprising a robot arm.

8. The modular robot of claim 6, wherein the second module is an autonomous mobile robot comprising a robot arm.

9. The modular robot of claim 5, wherein the attachable position probe is configured to transmit the position wirelessly.

10. The modular robot of claim 6, wherein the attachable position probe is configured to transmit the position wirelessly.

11. The modular robot of claim 7, wherein the attachable position probe is configured to transmit the position wirelessly.

12. The modular robot of claim 9, wherein the attachable position probe is a transponder that is configured for localization.

13. A collision avoidance system comprising:
at least one computer configured to operate a modular robot, wherein the modular robot comprises at least a first module and a second module, wherein each of the first module and the second module includes at least one movable element, wherein the at least one movable element of the first module and the at least one movable element of the second module together form a kinematic chain, wherein the first module includes a first controller, wherein the first controller includes a first failsafe position detection for the at least one movable element of the first module, wherein the second module includes a first single position detector for one or more movable elements of the at least one movable element of the second module, wherein the at least one computer being configured to operate the module robot comprises the at least one computer being configured to:
control the second module, the control of the second module comprising detection of a first position of the at least one movable element of the second module via the first single position detector;
detect of a second position of the at least one movable element of the second module via a second single position detector, the second single position detector being configured as a position probe that is attachable to the at least one movable element of the second module;
combine the first position with the second position, such that a second failsafe position detection is formed;
combine the first failsafe position detection with the second failsafe position detection, such that a combined failsafe position detection is formed for the modular robot; and
control the modular robot based on the combined failsafe position detection.

14. The collision avoidance system of claim 13, wherein the first module is a driverless transport vehicle.

15. The collision avoidance system of claim 13, wherein the second module is an autonomous mobile robot comprising a robot arm.

* * * * *